United States Patent [19]

Wathor

[11] Patent Number: 4,814,747
[45] Date of Patent: Mar. 21, 1989

[54] KEYBOARD STORAGE FOR A TERMINAL

[76] Inventor: J. D. Wathor, 525 Starling Ave., Livermore, Calif. 94550

[21] Appl. No.: 55,288

[22] Filed: May 29, 1987

[51] Int. Cl.⁴ ............................................... A47B 97/00
[52] U.S. Cl. ................................... 340/407; 340/711; 341/22
[58] Field of Search ............... 340/407, 365 R, 365 V, 340/365 L; 273/148 B, DIG. 28; 312/282, 208; 248/677; 400/691, 693, 472

[56] References Cited

U.S. PATENT DOCUMENTS

| | | | |
|---|---|---|---|
| 4,145,097 | 3/1979 | Naess et al. | 273/148 B |
| 4,294,496 | 10/1981 | Murez | 312/282 X |
| 4,496,943 | 1/1985 | Greenblatt | 379/96 |
| 4,527,149 | 7/1985 | Swensen | 340/365 R |
| 4,658,124 | 4/1987 | Bertina | 248/677 X |

FOREIGN PATENT DOCUMENTS 2069197  8/1981  United Kingdom ............ 340/365 S Primary Examiner—Joseph A. Orsino
Assistant Examiner—Brian R. Tumm
Attorney, Agent, or Firm—James E. Eakin

[57] ABSTRACT

A terminal in which the keyboard is adapted to be stored on the face of the monitor when it is not in use, thus freeing the work surface for other use. For this purpose, the usual feet used to elevate the back edge of the keyboard to tilt the keyboard towards the operator are spaced apart a distance that is less than the width of the monitor and are provided with cushioning and frictioning material on the front edge thereof as well as on the free edge thereof whereby a cushioning and frictioning material on the front edge of the feet will engage the front edge of the housing adjacent to the display screen and thus frictionally retain the keyboard on the housing.

2 Claims, 2 Drawing Sheets

KEYBOARD STORAGE FOR A TERMINAL

This invention relates to a terminal having a keyboard for entering data to a processor and a monitor for displaying output data from the processor, and more particularly to means for storing the keyboard when it is not in use.

BACKGROUND OF THE INVENTION

In a computer terminal, there is normally a base that rests on a work surface such as a desk, table or stand and on which the monitor is mounted. The keyboard is normally positioned on the work surface in front of the monitor so that the operator can see what is displayed on the screen of the monitor as information is entered at the keyboard. The monitor and the keyboard require considerable space so there is little room on the working surface to do other work when the terminal is not being used. To provide additional work space, the keyboard can be moved to a more convenient place to the back or to the side but this requires that suitable space be available at the back or the side of the work area, which is normally not the case. A keyboard may also be stored temporarily on the monitor but in this position the keyboard can readily slide off by itself or when it is brushed or jarred, which can damage the keyboard or whatever it contacts when it falls.

SUMMARY OF THE INVENTION

Accordingly, it is an object of this invention to provide means for temporarily storing the keyboard off the work surface when it is not in use to free the work surface for other use, which means is simple and inexpensive, easy to use, and which will securely and safely retain the keyboard in its stored position. In accordance with the invention, the storing means comprises the pair of feet usually provided at the back of the keyboard to raise the back of the keyboard and thus tilt the keyboard forwardly to make it easier for the operator to type. The feet are fitted with a cushioning and frictioning material that normally contacts the supporting surface to tilt the back of the keyboard, and which is also adapted to contact the top of the screen of the monitor to hang the keyboard on the face of the monitor. The feet are normally adapted to be swung between a retracted position in which they are positioned within the outline of the base and an extended position. With the feet retracted, the keyboard is adapted to lie flush on the work surface and when the feet are turned to their extended or working position, the back of the keyboard is raised to tilt the keyboard relative to the work surface toward the operator. The feet are also spread apart widthwise of the keyboard a distance that is less than the width of the monitor so that both of the feet will engage the top edge of the monitor when the keyboard is hung on the face of the monitor. The cushioning and frictioning material in this case holds the feet from sliding off the top of the monitor.

BRIEF DESCRIPTION OF THE DRAWINGS

The present invention is hereinafter described with reference to the accompanying drawings in which.

DETAILED DESCRIPTION

Figure 1:
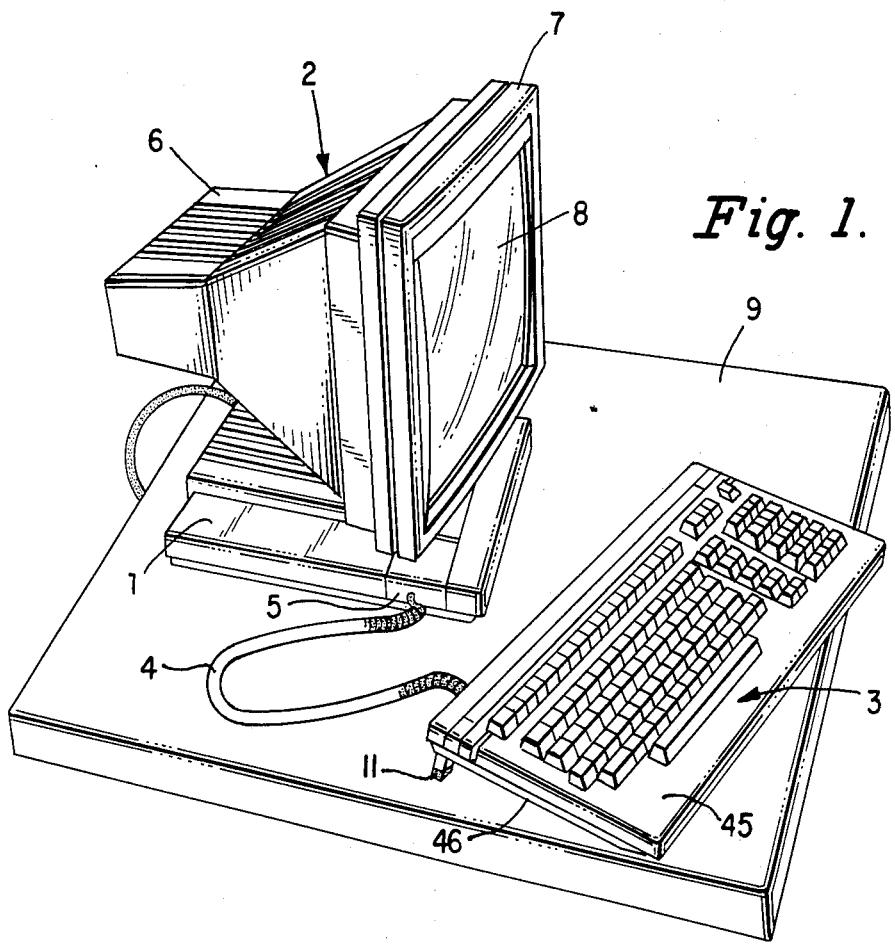
FIG. 1 is a perspective view of a terminal in accordance with this invention.

With reference to the drawings, there is shown in FIG. 1 a terminal comprising a base 1, a monitor 2, and a keyboard 3. The keyboard 3 is connected to the base 1 by a cable 4 having a cartridge 5 that plugs into the side of the base 1. Monitor 2 includes a housing 6 having a bezel 7 that surrounds a display screen 8 at the front of the housing. The base 1 rests on a work surface 9 and the monitor 2 is mounted on the base 1 for swinging about a vertical axis and for tilting about a horizontal axis to position the display screen 8 comfortably for use by the operator.

Figure 2:
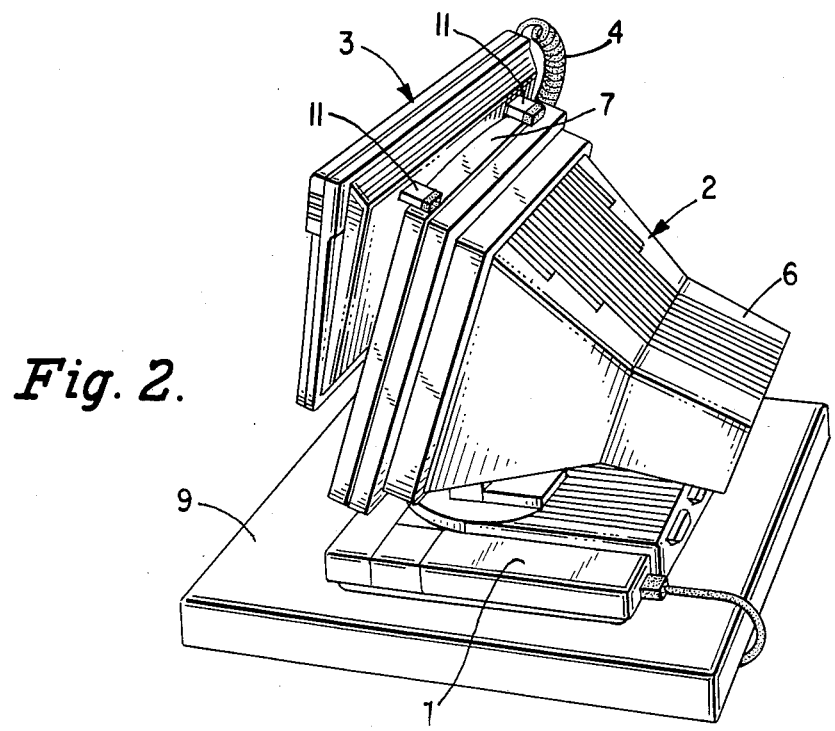
FIG. 2 is a perspective view of the terminal of FIG. 1 from the opposite side and from the back, and with the keyboard hanging on the monitor.

In the usual manner, the base 1 and monitor 2 are positioned back from the front edge of the work surface 9 to provide a space for receiving the keyboard 3 in front of the display screen 8 of the monitor 7 so that the operator can readily view the display screen 8 to see what is being entered at the keyboard 3. To clear the space at the front of the work surface 9 for other work when the keyboard 3 is not being used, the keyboard is adapted to be hung on the monitor 2 as shown in FIG. 2, and particularly, to be hung on the front edge of the bezel 7 with the keyboard 3 depending over the display screen 8.

Figure 6:
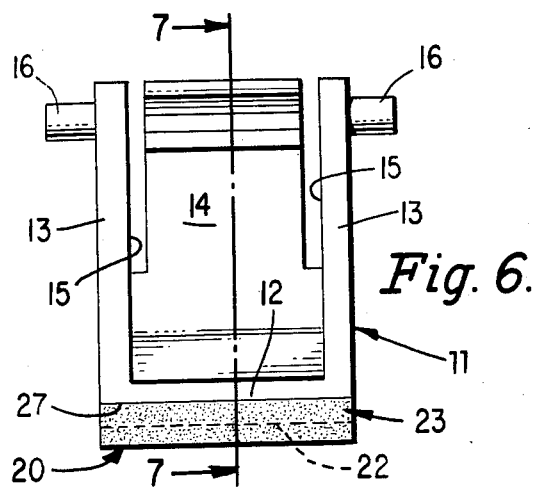
FIG. 6 is an elevational view of a foot per se of the keyboard of FIG. 1.
Figure 7:
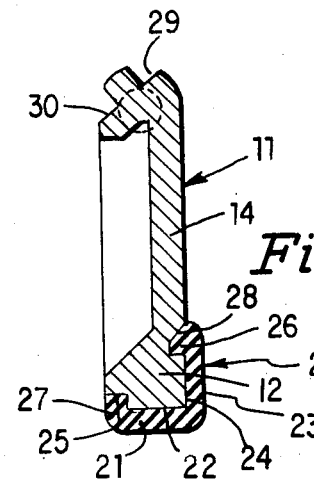
FIG. 7 is a sectional view on the line 7—7 of FIG. 6.

In the usual manner, the keyboard 3 is adapted to be supported with the back edge thereof raised from the work surface 9 so that it is tilted toward the operator for more comfortable use by the operator. To support the back edge of the keyboard raised, there are provided a pair of identical feet 11. As shown in FIGS. 6 and 7, the feet 11 each comprise a free end 12 from which extends a pair of arms 13 outwardly of a central portion 14 that is separated from the arms 13 by slots 15. The arms 13 are provided with outwardly extending trunnions 16 for pivotly mounting the foot in the keyboard—the arms 13 being flexible to permit the trunnions to be snapped into position during assembly.

A molded rubber shoe 20 of a cushioning and frictioning material is adapted to fit on the free end 12 of the foot 11, the shoe 20 including a first portion 21 that fits over the end 22 of the foot 11 and a second portion 23 that is substantially normal to the first portion 21 and extends upwardly over the outer face 24 of the foot 11. The shoe 20 has ribs 25 and 26 extending at right angles from the free ends of the first and second portions 21 and 23 and are adapted to be received in grooves 27 and 28 respectively to hold the shoes 22 releasably in place on the free ends 12 of the foot 11.

The end of the central portion 14 opposite from the shoe 20 is formed with a pair of notches 29 and 30 running lengthwise thereof to provide detents for holding the foot 11 in the set position.

Figure 3:
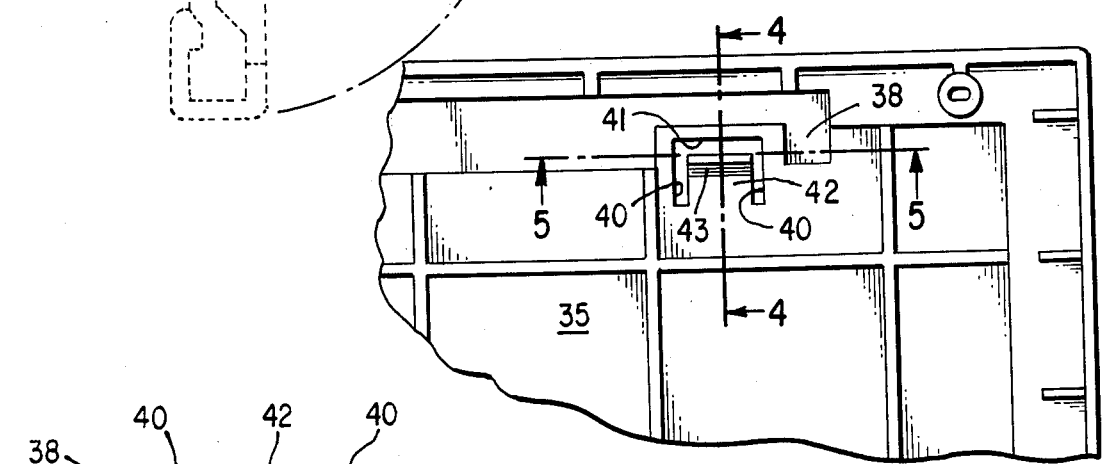
FIG. 3 is a fragmentary plan view of the bottom plate of the keyboard per se of the terminal shown in FIG. 1, without the supporting foot.

With reference to FIG. 3, the keyboard 3 comprises a bottom plate 35 which, at the opposite ends thereof (only one of which is shown, is formed with a pair of slots 36). (FIGS. 4 and 5) in the sidewalls 37 of a depending lug 38, at the bottom of which slots 36 there are apertures 39 adapted to receive the trunnions 16 on the foot 11. The slots 36 in the sidewalls 37 taper inwardly toward the apertures 39 so that the trunnions 16, which fit within the slots at the open ends thereof, are forced inwardly as the arms 13 flex when the foot 11 is forced into the slots until the trunnions register with the apertures 39 at the base, at which time they snap outwardly under the action of the arms 13 to seat the trunnion 16 in the apertures 39.

The plate 35 is also formed with a pair of slots 40 (FIG. 3) transversely thereof and a cooperating longitudinal slot 41 to provide a spring finger 42 having a catch 43 adapted to engage the notches 29 and 30 in the foot 11 to hold the foot in the set position—the spring finger 42 being adapted to flex to permit the catch 43 to snap over the end of the foot between the notches when the foot 11 is moved between its retracted and extended positions.

The bottom plate 35 of the keyboard 3 is adapted to be closed by a top plate 45 (FIG. 1) through which the usual alphanumeric and function keys extend. The keyboard is adapted to be seated with the bottom surface 46 thereof on the work surface 9 when the feet 11 are in the retracted positions, that is, with the free ends 22 of the feet 11 raised above the bottom surface 46 of the keyboard 3 and the catches 43 seated in the notches 29 of the feet 11 as shown in the full-line position in FIG. 4.

Figure 4:
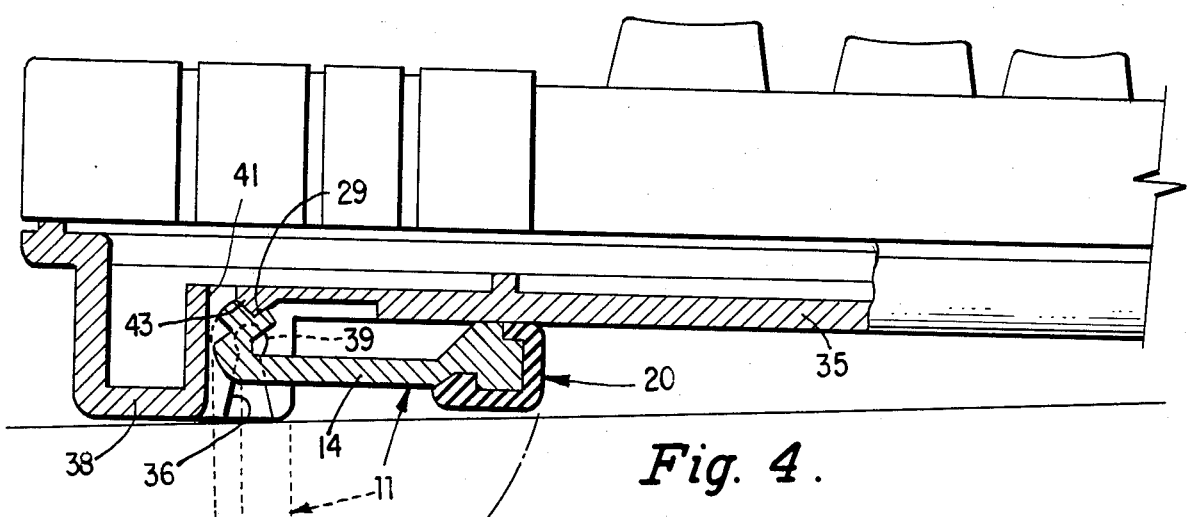
FIG. 4 is a fragmentary sectional view substanding on the line 4—4 of FIG. 3 on an enlarged scale.
Figure 5:
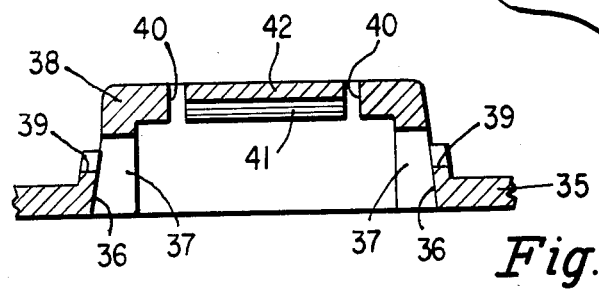
FIG. 5 is a detail sectional view on an enlarged scale on the line 5—5 of FIG. 3.

When the feet 11 are moved to their extended position in which they are arranged generally normal to the bottom surface 46 of the keyboard, that is, the dotted line position in FIG. 4, the back of the keyboard is raised to tilt the same toward the operator. At this time, the first portion 21 of the shoe 20 is in contact with the work surface 9 and acts to frictionally resist movement of the keyboard 3 relative to the work surface.

With the feet 11 in the extended position, the keyboard 3 may also be hung on the monitor when it's not in use to remove it from the work surface 9 and thus provide for use of the work surface 9 for other purposes. Thus the second portion 23 of the shoe 20 is adapted to rest on top of the bezel 7 along the front edge thereof adjacent to the display screen 8. For this purpose, the spacing between the feet 11 is slightly less than the width of the bezel 7 so that the feet 11 will rest on the bezel adjacent the opposite ends thereof. The feet with the shoes 20, thus support the keyboard on the bezel as shown on FIG. 2 and frictionally resist sliding of the keyboard off the bezel.

I claim:

1. In a terminal comprising a monitor and a keyboard connected to said monitor for entering information, said monitor being adapted to be supported relative to a work surface and having a housing and a display screen mounted in said housing, said housing having an upper edge at the front thereof above said display screen, said keyboard having a bottom surface adapted to rest on the work surface in front of said monitor, and means for supporting the back of said keyboard raised relative to the work surface to tilt the keyboard toward the operator and for hanging said keyboard on said monitor when it is not in use, said means comprising a pair of feet mounted on said keyboard adjacent to the back edge thereof and extending therefrom substantially normal to said bottom surface to free ends adapted to engage the work surface to support the back of said keyboard raised relative to the work surface, said feet being spaced apart along the back edge of said keyboard a distance that is less than the width of the upper edge at the front of said housing whereby front edges of said feet are adapted to engage the upper edge at the front of said housing, said feet having cushioning and frictioning elements fitted on the free ends thereof and having portions adapted to be disposed between the front edges of said feet and the upper edge at the front of said housing.

2. In a terminal in accordance with claim 1 in which said cushioning and frictioning elements comprise molded elements having a first face at the free ends of said feet and a second face extending therefrom along the front edges of said feet and fastening portions extended from said first and second faces and cooperating with said surfaces of said feet for reasonably securing said elements to said feet.

* * * * *